(12) United States Patent
Burgers et al.

(10) Patent No.: US 10,787,615 B2
(45) Date of Patent: Sep. 29, 2020

(54) METHOD AND SYSTEM FOR TREATING A FLOW BACK FLUID EXITING A WELL SITE

(71) Applicants: Kenneth L. Burgers, E. Amherst, NY (US); Raymond F. Drnevich, Clarence Center, NY (US); Minish M. Shah, E. Amherst, NY (US); David R. Thompson, Grand Island, NY (US)

(72) Inventors: Kenneth L. Burgers, E. Amherst, NY (US); Raymond F. Drnevich, Clarence Center, NY (US); Minish M. Shah, E. Amherst, NY (US); David R. Thompson, Grand Island, NY (US)

(73) Assignee: PRAXAIR TECHNOLOGY, INC., Danbury, CT (US)

(*) Notice: Subject to any disclaimer, the term of this patent is extended or adjusted under 35 U.S.C. 154(b) by 883 days.

(21) Appl. No.: 14/166,304

(22) Filed: Jan. 28, 2014

(65) Prior Publication Data

US 2015/0210936 A1   Jul. 30, 2015

(51) Int. Cl.
*E21B 43/40* (2006.01)
*C10G 31/06* (2006.01)
(Continued)

(52) U.S. Cl.
CPC .............. *C10G 31/06* (2013.01); *C10L 3/06* (2013.01); *C10L 3/104* (2013.01); *E21B 43/164* (2013.01); *E21B 43/26* (2013.01); *E21B 43/2605* (2020.05); *E21B 43/40* (2013.01); *F25J 3/0209* (2013.01); *F25J 3/0233* (2013.01); *F25J 3/0266* (2013.01); *F25J 3/061* (2013.01); *F25J 3/067* (2013.01); *F25J 3/0635* (2013.01); *C10L 2290/02* (2013.01); *C10L 2290/06* (2013.01);
(Continued)

(58) Field of Classification Search
CPC ...... F25J 2205/80; F25J 2260/80; F25J 3/067; E21B 43/34–40; E21B 43/2605
See application file for complete search history.

(56) References Cited

U.S. PATENT DOCUMENTS

| | | | |
|---|---|---|---|
| 4,441,900 A * | 4/1984 | Swallow | C07C 7/09 |
| | | | 62/622 |
| 4,762,543 A | 8/1988 | Pantermuehl et al. | |

(Continued)

FOREIGN PATENT DOCUMENTS

| | | |
|---|---|---|
| WO | WO 2012/048078 A1 | 4/2012 |
| WO | WO 2014/085057 A2 | 6/2014 |
| WO | WO 2014/086057 A2 | 6/2014 |

*Primary Examiner* — John F Pettitt, III
(74) *Attorney, Agent, or Firm* — Iurie A. Schwartz

(57) ABSTRACT

The present invention relates to a method and system for treating a flow back fluid exiting a well site following stimulation of a subterranean formation. More specifically, the invention relates to processing the flow back fluid, and separating into a carbon dioxide rich stream and a carbon dioxide depleted stream, and continuing the separation until the carbon dioxide concentration in the flow back stream until the carbon dioxide concentration in the flow back gas diminishes to a point selected in a range of about 50-80 mol % in carbon dioxide concentration, after which the lower concentration carbon dioxide flow back stream continues to be separated into a carbon dioxide rich stream which is routed to waste or flare, and a hydrocarbon rich stream is formed.

8 Claims, 9 Drawing Sheets

(51) Int. Cl.
*E21B 43/16* (2006.01)
*C10L 3/10* (2006.01)
*E21B 43/26* (2006.01)
*C10L 3/06* (2006.01)
*F25J 3/02* (2006.01)
*F25J 3/06* (2006.01)

(52) U.S. Cl.
CPC ..... *C10L 2290/48* (2013.01); *C10L 2290/543* (2013.01); *C10L 2290/548* (2013.01); *C10L 2290/567* (2013.01); *F25J 2200/02* (2013.01); *F25J 2200/70* (2013.01); *F25J 2205/40* (2013.01); *F25J 2205/80* (2013.01); *F25J 2215/04* (2013.01); *F25J 2230/20* (2013.01); *F25J 2230/30* (2013.01); *F25J 2270/04* (2013.01); *F25J 2270/90* (2013.01); *F25J 2270/906* (2013.01); *F25J 2290/70* (2013.01); *Y02C 10/12* (2013.01)

(56) References Cited

U.S. PATENT DOCUMENTS

| | | | |
|---|---|---|---|
| 5,964,923 | A | 10/1999 | Lokhandwala |
| 6,648,944 | B1 | 11/2003 | Baker et al. |
| 6,955,704 | B1 * | 10/2005 | Strahan .................. B01D 53/22 |
| | | | 166/267 |
| 7,252,700 | B1 | 8/2007 | Strahan |
| 2005/0092594 | A1 | 5/2005 | Parro et al. |
| 2005/0229778 | A1 | 10/2005 | Backhaus et al. |
| 2006/0162924 | A1 | 7/2006 | Blevins et al. |
| 2010/0107686 | A1 | 5/2010 | Bras et al. |
| 2010/0232985 | A1 | 9/2010 | Jensvold et al. |
| 2012/0000355 | A1 | 1/2012 | Sharma et al. |
| 2012/0085238 | A1 | 4/2012 | Zhou et al. |
| 2012/0111051 | A1 * | 5/2012 | Kulkarni .............. B01D 53/229 |
| | | | 62/619 |
| 2012/0157743 | A1 | 6/2012 | Liu et al. |
| 2014/0243572 | A1 | 8/2014 | Straub et al. |
| 2014/0262285 | A1 * | 9/2014 | Sethna .................. E21B 43/267 |
| | | | 166/305.1 |

* cited by examiner

METHOD AND SYSTEM FOR TREATING A FLOW BACK FLUID EXITING A WELL SITE

BACKGROUND OF THE INVENTION

1. Field of the Invention

The present invention relates to a method and system for treating a flow back fluid exiting a well site (i.e., a single well or cluster of wells) following stimulation of a subterranean formation. More specifically, the invention relates to recovering the flow back fluid, and separating it into a carbon dioxide rich product stream and a carbon dioxide depleted stream, and continuing the separation until the carbon dioxide concentration in the flow back stream diminishes to a range of 50-80 mol %. Thereafter, the lower concentration carbon dioxide flow back stream continues to be separated into a carbon dioxide rich stream and a hydrocarbon rich product stream. The system includes several production units, which individually and combined can be placed on one or more mobile devices.

2. Description of Related Art

Fracturing of various subterranean formations with water, carbon dioxide, and other carrier fluids has been practiced for some time. It will be understood by those skilled in the art that fracturing fluid, carrier gas or simply gas, as utilized herein, refers to liquid phase, gas phase or combination thereof. Wells stimulated/fractured with a carbon dioxide ($CO_2$) carrier fluid typically require large amounts of liquid $CO_2$, often at significant distances from traditional $CO_2$ sources. Transportation cost of liquid $CO_2$ is directly related to the distance from the $CO_2$ source. Typically, the wells stimulated with a $CO_2$ based fracturing fluid (which may include water or some other fluid), after separation of any solids, liquids and/or oil, emit an initial raw fluid (also referred to as flowback fluid) that is a mixture of fracturing fluid $CO_2$ and reservoir fluid with concentration of fracturing fluid in the mixture declining over a certain period of time to a value that is typical of the reservoir fluid. Thus, flowback fluid would contain natural gas, other hydrocarbons and contaminates, such as hydrogen sulfide ($H_2S$), water ($H_2O$) and $CO_2$. Therefore, where $CO_2$ from flow back fluid of a newly fractured well can be recovered and liquefied, it may be used to fracture a nearby well and reduce the logistical issues of providing large amounts of liquid $CO_2$ to often remotely-located wells.

The composition of the flow back fluid from a well stimulated with a $CO_2$ based fracturing fluid is a blend of the fracturing fluid and fluid that was in the geological formation before fracturing occurred. The ratio of fracturing fluid to fluid from the geological formation is initially high and declines over a period of time. Following a $CO_2$ based fracturing and the initialization of flow back from the well, there is typically a delay of 5-30 days (in some instances as much as 90 days) before the gas can be sent to the downstream processing facility or pipeline due to $CO_2$ concentrations in the flow-back gas being higher than the expected concentration from the reservoir. The requirement for $CO_2$ concentration for downstream processing facility or pipeline gas is typically in the range of 2-10 mol %. Typically, $CO_2$ concentration in the flow back fluid starts at a high concentration (>90%) and declines, as shown in FIG. 1.

Until the fluid from the well is below the maximum specified $CO_2$ concentration, it cannot be sent to a downstream processing facility or pipeline as product. Thus, the fluid/gas has typically been vented or flared until it meets the $CO_2$ concentration specification, at which point it can be used as a product. When flow back fluid contains >70% $CO_2$, flaring operation requires addition of natural gas to maintain or otherwise render the flaring operation self-sustainable. Thus, the valuable hydrocarbons contained in the fluid from the well are initially wasted and additional natural gas is utilized.

In the related art, cleaning of the dirty flow back fluid has been considered. For example, U.S. Pat. Nos. 6,955,704 B1 and 7,252,700 B1 to Strahan considered cleaning the dirty gas from a newly stimulated well, where such fluid is routed to a mobile gas separator where the carbon dioxide, hydrogen sulfide and water are removed, and the gaseous natural gas (presumably meeting specification) is sent via the pipeline to a customer.

Nonetheless, the related art does not address the processing and recovering of the $CO_2$ immediately following the stimulation of the well when the concentration of $CO_2$ in the flow back fluid is high, and switching over to a $CO_2$ rejection mode when the concentration of $CO_2$ in the flow back fluid drops below a certain level, so that the hydrocarbon fluid can be recovered. In addition, the related art does not address the utilization of membranes which can be utilized with flow back fluids which are high in concentrations of $C_{2+}$ hydrocarbons and which allow for these high value compounds to be recovered in liquid form.

To overcome the disadvantages of the related art, it is an object of the invention to (a) reduce the cost of providing $CO_2$ for well fracturing, (b) reduce the natural gas consumption during the flaring operation and (c) recover gaseous and liquid hydrocarbons separately. The present invention provides for the operation of the system continuously and in essentially two modes, immediately following the fracturing of a well. In the first mode, where the concentration of $CO_2$ in the flow back fluid is relatively high, the $CO_2$ is separated and recovered. In the second mode, where the concentration of $CO_2$ in the flow back fluid is diminished to a predetermined level of concentration, the system continues to separate a $CO_2$ enriched stream which is sent to waste or flare, while one or more streams enriched in hydrocarbons are recovered as products.

Other objects and aspects of the present invention will become apparent to one of ordinary skill in the art upon review of the specification, drawings and claims appended hereto.

SUMMARY OF THE INVENTION

According to an aspect of the invention, a method of treating a flow back fluid exiting a well site following stimulation of a subterranean formation is provided. The method includes:

processing a flow back fluid exiting a well site, and separating the flow back fluid into a carbon dioxide rich stream and a carbon dioxide depleted stream, wherein the carbon dioxide rich stream is further processed to form a carbon dioxide liquid product, while the carbon dioxide depleted stream is utilized in downstream processing to aid the formation of the carbon dioxide liquid product;

continuing to separate the flow back fluid into a carbon dioxide rich stream and a carbon dioxide depleted stream until the carbon dioxide concentration in the flow back gas diminishes to a point selected in a range of about 50-80 mol % in carbon dioxide concentration, after which the lower concentration carbon dioxide flow back stream continues to be separated into a carbon dioxide rich stream which is routed to waste or flare, and a hydrocarbon rich product streams are formed.

According to another aspect of the invention, a method of processing the flow back fluid from a well site, while operating in dual mode is provided. The method includes:

processing the flow back gas exiting a well site where in a first mode the flow back gas is separated into a carbon dioxide rich stream and a carbon dioxide lean stream, and the carbon dioxide rich stream is further processed to form a carbon dioxide liquid product, while the carbon dioxide lean stream is optionally employed in another part of the process or otherwise flared until the carbon dioxide concentration level in the flow back fluid exiting the well site has dropped to a point in a range of about 50-80 mole %; and sequentially switching to a second mode where the flow back fluid is separated into a carbon dioxide rich stream and the carbon dioxide rich stream is routed to waste or flared, while the carbon dioxide lean stream, rich in hydrocarbons is recovered as gaseous and liquid hydrocarbon products.

In accordance with yet another aspect of the present invention, a system for processing the flow back fluid from a well site following stimulation of a subterranean formation is provided. The system includes:

a pretreatment unit to receive and process the flow back fluid from the well site and remove any one of water, solid particulates, liquid hydrocarbons, hydrogen sulfide or a combination thereof;

a membrane unit downstream of the pretreatment unit to receive the pretreated flow back fluid therefrom and separate the pretreated flow back fluid into a carbon dioxide rich permeate stream and a carbon dioxide depleted retentate stream;

a permeate cooling unit to receive the carbon dioxide rich permeate stream and reduce the temperature of the stream to a temperature ranging from about −40 to 20° F.; and a phase separator to receive the lower temperature carbon dioxide rich permeate stream from the permeate cooling unit and separate the stream into a first liquid stream of predominantly carbon dioxide and a first gaseous stream enriched in methane.

BRIEF DESCRIPTION OF THE FIGURES

The objects and advantages of the invention will be better understood from the following detailed description of the preferred embodiments thereof in connection with the accompanying figures wherein like numbers denote same features throughout and wherein.

DETAILED DESCRIPTION OF THE INVENTION

Figure 1:
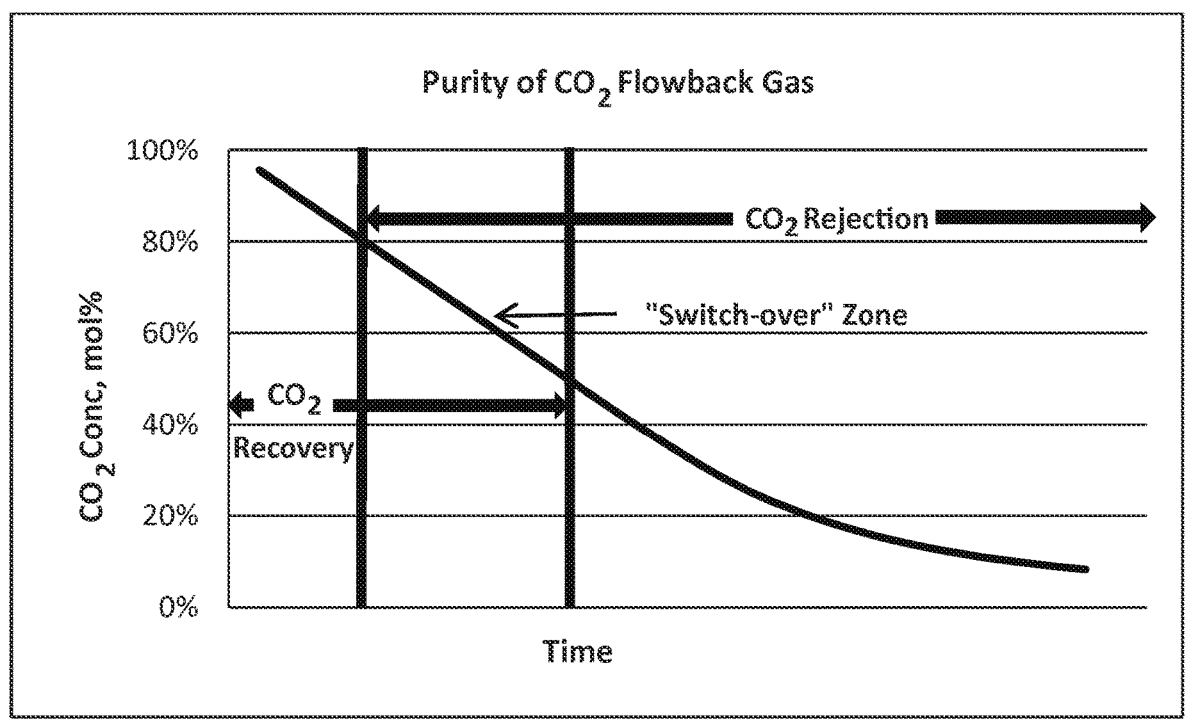
FIG. 1 illustrates a plot of $CO_2$ concentration vs. time for flow back gas from a $CO_2$-fractured well.

The present invention provides a system for the treatment of a flow back fluid exiting a well site immediately following stimulation of a subterranean formation until the concentration approaches the natural $CO_2$ concentration in the reservoir, irrespective of the type of formation. As explained below, the process commences immediately following stimulation, but the system may be employed at the well site for several months given that it is designed to ultimately switch to a $CO_2$ rejection mode, where the hydrocarbon product is recovered and sent to a natural gas pipeline or processing plant.

The system and process of the present invention, explained in detail below, operate in two modes—$CO_2$ recovery and $CO_2$ rejection. During the first portion of the flow back, when $CO_2$ concentration is relatively high, the process operates in $CO_2$ recovery mode and produces a liquid product comprising mostly liquid $CO_2$ with smaller amounts of hydrocarbons and nitrogen, suitable for use in subsequent $CO_2$ fracturing operations or other uses. This mode also produces a hydrocarbon waste stream containing depleted amounts of $CO_2$ that will typically be sent to a flare after it has been used in the downstream process for the production of liquid $CO_2$ product.

The $CO_2$ recovery process includes several unit operations including pretreatment, bulk gas separation, cooling, and phase separation/$CO_2$ enrichment. In an exemplary embodiment a membrane is utilized for the separation following the pretreatment. The membrane preferentially permeates $CO_2$ over methane, $C_{2+}$ hydrocarbons and nitrogen and produces a permeate stream enriched in $CO_2$. Cooling and partial condensation followed by phase separators achieve additional separation of methane and nitrogen from the $CO_2$ enriched permeate to produce the $CO_2$ rich product. During the second portion of the flow back, when $CO_2$ concentration in flowback fluid drops below a certain level (i.e, a point selected in a range of 50-80 mol %), the process is reconfigured to perform $CO_2$ rejection. This mode of operation is continued until $CO_2$ concentration in the flowback fluid stabilizes to levels (e.g., 2-10 mol %) suitable for transport to a centralized gas processing plant or for direct addition to a natural gas pipeline. The products in $CO_2$ rejection mode are gaseous and liquid hydrocarbon streams with the $CO_2$ concentration controlled to a specific level, typically 2-10 mol % to meet the downstream requirements of the processing plant or a pipeline. The production of a liquid hydrocarbon stream is dependent upon the presence of $C_{3+}$ hydrocarbons in the flowback fluid. During this mode of operation, a low pressure waste stream inclusive of a mixture of $CO_2$ and hydrocarbons is produced and typically will be sent to a flare. $CO_2$ is not readily recovered from the waste stream because of its low pressure and low $CO_2$ concentration.

In the $CO_2$ rejection mode, the same system as for $CO_2$ recovery can be employed, but certain equipment is taken off line. For example, cooling and liquid $CO_2$ phase separation unit operations are not needed for $CO_2$ rejection. Thus, the entire system is modular and mobile in its entirety or only parts thereof, and can easily be moved from one well location to another.

There is a range of $CO_2$ concentrations (50-80 mol %) in which the process could be operated in either the $CO_2$ recovery mode or the $CO_2$ rejection mode. Two operating modes ($CO_2$ recovery and $CO_2$ rejection) would always be carried out sequentially. Thus, switchover from $CO_2$ recovery to $CO_2$ rejection could occur at any point in the 50-75 mol % $CO_2$ concentration range depending on the relative economic drivers for recovery of liquid $CO_2$ product vs. recovery of hydrocarbon product streams.

Figure 2:
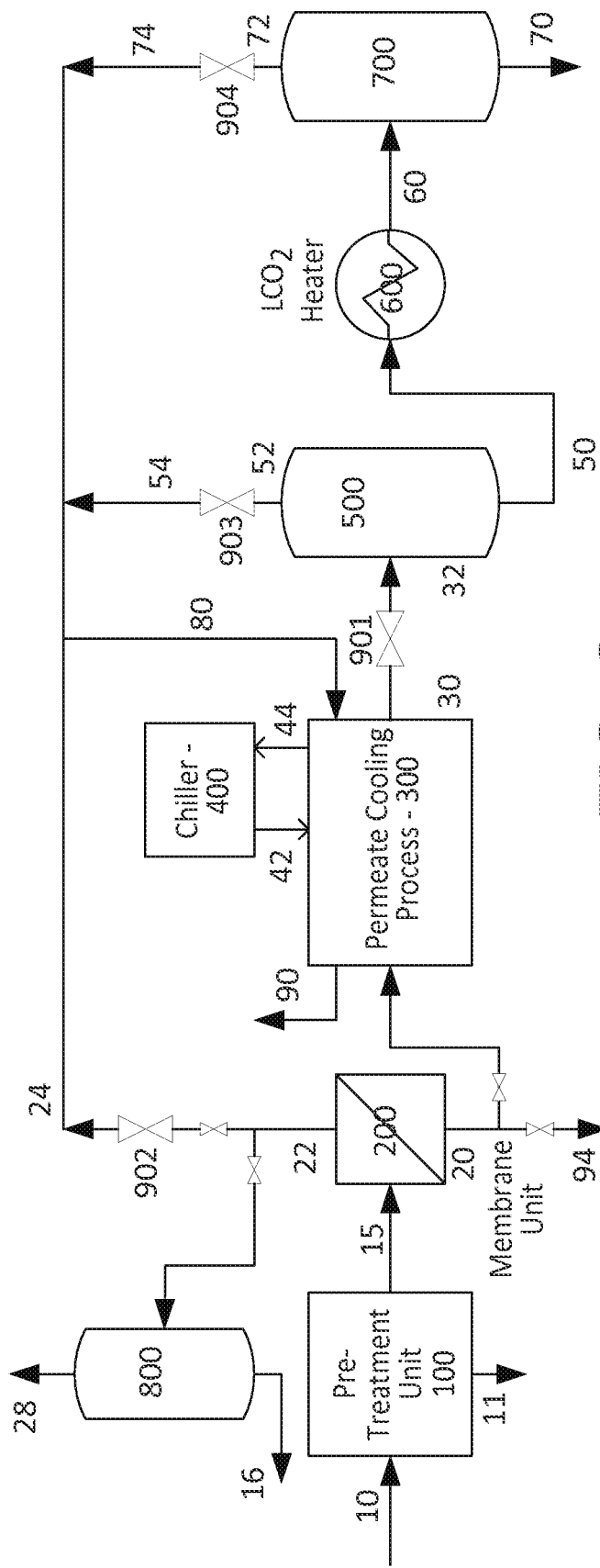
FIG. 2 is a schematic illustration of a system and associated process for treating the flow back fluid exiting a well site which is operated in a $CO_2$ recovery mode.

With reference to FIG. 2, the system for treating the flow back fluid exiting the well site is illustrated. Flow back fluid 10 exiting the well site following stimulation of a particular formation enters a pretreatment unit 100, or alternatively bypasses the drier component (not shown) of the pretreatment unit 100 and then is routed to separator unit 200. Flow back fluid downstream of the well-head is typically at pressures ranging from about 1000-2000 psig and temperatures ranging from 80-130° F. The pretreatment unit 100 includes known processes for the removal of water (i.e., drier) and optionally $H_2S$, solid particulates and/or liquid hydrocarbons from the flow back fluid 10. Stream 11 represents all contaminants removed by the pretreatment section. However, more than one such stream may exist depending on the configuration of the pretreatment unit 100. The pretreatment unit 100 may also include valves and instrumentation for controlling pressure and/or flow rate of flow back fluid to the downstream operational units. Liquid/gas phase separation may be required after any pressure reducing device such as a control valve. Flow back gas pressures above 500 psig are sufficient to achieve separation between $CO_2$ and hydrocarbon. When flow back gas pressure is higher than 1000 psig, pressure difference between the feed and permeate side of the separation unit is set to meet the tolerance of the membrane utilized (e.g., typically up to 1000 psi).

In the exemplary embodiment of FIG. 2, pretreated flow back fluid 15 enters a membrane separation unit 200, where the pretreated flow back fluid 15 is separated to a carbon dioxide rich stream 20 and a carbon dioxide depleted stream 22. It will be recognized by those skilled in the art that other gas separation technologies, such as adsorption or absorption may be employed, although the membrane based system is preferred. In the event the flow back fluid has a $CO_2$ concentration of 95 mol % or higher the flow back fluid can be routed to the cooling unit, discussed below, bypassing separation unit 200. Permeate 20 is higher in $CO_2$ concentration (i.e., 100-83%) than the pretreated flow back fluid 15 (i.e., 100-50%) and the retentate 22 is lower (i.e., 35-40%) in $CO_2$ concentration than the pretreated flow back fluid 15. Liquid hydrocarbons can form on the retentate side of the membrane due to Joule-Thomson cooling caused by the reduction in pressure of gas as it passes through the membrane wall. The tendency to form liquid hydrocarbons is determined by stream conditions and composition of the pretreated flowback fluid 15, the pressures of the permeate 20 and retentate 22, and the relative flow rates of permeate 20 and retentate 22. Suitable membrane separators for the situation when no liquid hydrocarbons are in contact with the membrane are commercially available from the likes of Natco Group, Inc., UOP, L.L.C., and Kvaerrner Process Systems US, Inc. For situations where liquid hydrocarbons may contact the membrane, the fluid separator for this application can be a separation unit having polyether ether ketone (PEEK) membranes. Suitable membrane separators to handle large fraction of $C_{2+}$ components are commercially available from Porogen Corporation.

The pressure of carbon dioxide depleted stream (i.e., retentate) 22 will typically be 0.5-5 psi less than the feed pressure of pretreated flow back fluid 15, and the pressure of the carbon dioxide rich stream will typically be in the range of about 300-600 psig. In the case of a membrane, both streams 20 and 22 will typically exit the membrane at a lower temperature than the feed temperature, due to Joule-Thomson cooling associated with the pressure drop of the permeate across the membrane.

Permeate 20 (or carbon dioxide rich stream) is routed into a permeate cooling unit 300, where the permeate is cooled by indirect heat exchange with stream 42 from chiller unit 400 and a blend of cool process streams 80. Permeate 30 exiting cooling unit 300 is typically cooled to a temperature of −40 to 20° F. The blend of process streams 90 exits permeate cooling unit 300 and is typically sent to a flare. Naturally, the heat exchangers and Joule-Thomson valves employed, are known in the art, and are not described in any level of detail herein. Chiller 400 cools permeate 20 by heat exchange with either a refrigerant or a secondary heat transfer fluid 42. Refrigerant or secondary heat transfer fluid 44 is returned to chiller 400, where it is cooled by known processes and then it is recirculated as stream 42. The typical configuration for the chiller is a Carnot-cycle type (or derivative) mechanical refrigeration unit using a recirculating refrigerant. Such devices use a refrigerant compressor which may be driven by an electrical motor or, preferably, an engine typically fueled by natural gas, propane, gasoline or diesel fuel. If desired, the engine used to drive the refrigerant compressor may be a vehicle engine with a power take off mechanism. Alternative refrigeration processes may be used including heat driven absorption processes. Process stream 90 from the permeate cooling unit may be combusted to provide at least a portion of the heat needed for the heat driven absorption process.

Cooled permeate 30 is routed through a pressure reducing valve 901, where the pressure is reduced to the range of 60-500 psig, which further cools permeate (carbon dioxide rich stream) 32 to a temperature of about −70 to 20° F. The reduced pressure permeate 32 enters a first phase separator 500, where it is separated into a gaseous stream 52 enriched in the more volatile compounds contained in stream 32, such as methane and nitrogen, and a first liquid $CO_2$ stream 50, which consists of predominantly $CO_2$ and smaller amounts of methane, $C_{2+}$ hydrocarbons and nitrogen. The first phase separator is typically operating at a pressure ranging from 60-500 psig, and preferably 265-340 psig.

Under some circumstances, first liquid $CO_2$ stream 50 may be colder than the minimum allowable working temperature (MAWT) of liquid $CO_2$ receiver tanks or transport tanks, which is typically −20° F. If this is the case, the first liquid $CO_2$ stream 50 is warmed in a heat exchanger 600 to an acceptable temperature, typically warmer than about −20° F. The warmed liquid $CO_2$ 60 is sent to a second phase separator 700 where it is separated into a second gas stream 72 and a second liquid $CO_2$ stream 70. Second liquid $CO_2$ stream 70 is the desired product from the process and is sent to storage and/or transport. The process of warming liquid $CO_2$ and sending it to a second phase separator causes the liquid $CO_2$ from the second phase separator to have a lower concentration of methane than the liquid $CO_2$ from the first phase separator. This results in lower methane concentration to occur in the headspace of the $LCO_2$ storage tanks and reduces the tendency of the headspace gas to form gas mixtures that would be flammable when mixed with air. Optionally, a liquid $CO_2$ pump can be used on stream 50 or stream 70.

Retentate (carbon dioxide depleted stream) 22 and phase separator gas streams 52 and 72 are routed through pressure reducing valves 902, 903 and 904, respectively. The reduced pressure streams 24, 54 and 74 are blended into stream 80 and employed for cooling by indirect heat exchange in the permeate cooling unit 300, as discussed above. Although, a particular system and process configuration is shown in this FIG. 2, where the retentate and phase separator gases are blended prior to being routed to the permeate cooling unit 300, others are contemplated. For example, in another embodiment, these streams are not blended or only part of the retentate and/or phase separator gases are utilized in process cooling unit 300. Likewise, process configurations in which all the cooling is provided by chiller 400 may be employed or ones in which the membrane feed and/or retentate are cooled by chiller 400 and/or by blended stream 80 may be used.

An alternative process configuration is to employ purge gas 90 to cool the membrane feed 15 and/or flow back fluid 10 or to employ the mechanical chiller and/or cool process streams to cool the membrane feed. Cooling the membrane feed has the benefit of lowering the temperature of the membrane material and increasing the selectivity of the membrane for $CO_2$. Another potential benefit of cooling prior to the membrane is the potential to separate hydrocarbon liquids by phase separation.

Figure 3:
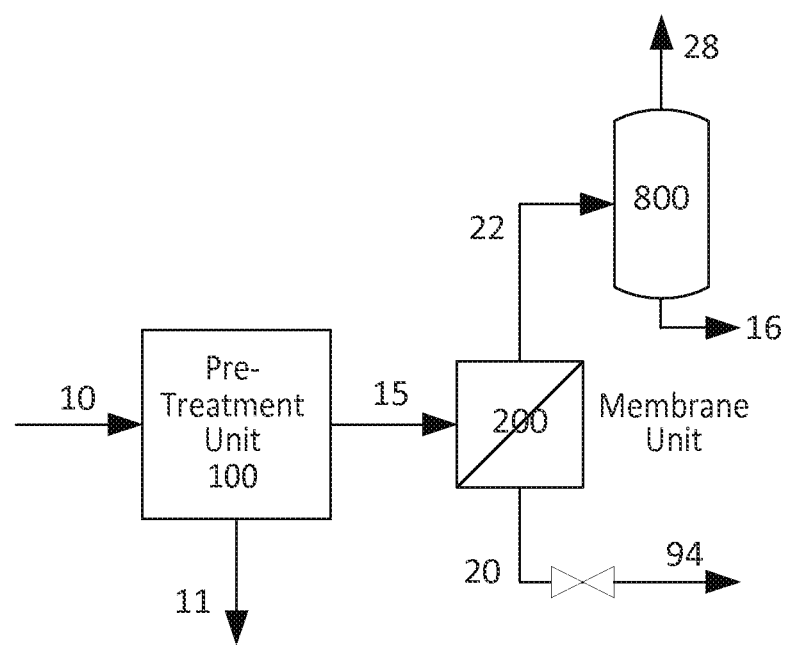
FIG. 3 is a schematic illustration of a system and associated process for treating the flow back fluid exiting a well site which is operated in a $CO_2$ rejection mode.

Once the concentration of carbon dioxide in the flow back fluid 10 diminishes to a range of about 50-80 mol %, the lower concentration flow back fluid 10 continues to be separated, but the system switches to a $CO_2$ rejection mode. With reference to FIG. 3, the process for rejecting the $CO_2$ from flow back fluid recovered from wells fractured with high pressure $CO_2$ is shown. Flow back fluid 10, enters a pretreatment unit 100. Some or all pretreatment steps may be bypassed when operating in $CO_2$ rejection mode. Only those pretreatment steps are employed which are needed for protecting the membrane or for producing a hydrocarbon rich product stream (i.e., pipeline ready natural gas). For example, water removal may not need to be done in the pretreatment process unit 100, as sufficient drying of the hydrocarbon rich product stream 22 will likely be performed by the membrane unit 20. Contaminants and/or other components that are removed in the pretreatment unit 100, exit as stream 11. Depending on how the pretreatment unit 100 is configured, there may be more than one such stream.

Pretreated flow back fluid 15 enters the membrane unit 200, which produces a permeate 20 and a retentate 22, which is sent to a phase separator 800, if needed. If liquid hydrocarbons exist in the retentate 22, a liquid hydrocarbon stream 16 is recovered separately from the gaseous stream 28. The liquid hydrocarbon stream is either mixed with the oil produced from the well or further processed and sold separately as natural gas liquids. $CO_2$ concentration of the retentate gas 28 is reduced to a specified concentration and the retentate gas 28 is sent to downstream processing plant or pipeline as product. The concentration of $CO_2$ in the retentate is generally in the range of 2-10 mol %. Permeate 20 contains mostly $CO_2$ and some hydrocarbons and is typically sent to flare as a waste gas 94. The permeate stream is typically set at a low pressure in the range of 5-50 psig. Membrane feed pressure is typically controlled to a pressure such that the pressure difference between feed and permeate does not cause the membrane material to rupture, but which is high enough to send the retentate 28 as a product without the need for a retentate compressor. Meanwhile, permeate cooling unit 300, chiller 400, phase separators 500 and 700 and liquid $CO_2$ heater 600 are not needed when operating in $CO_2$ rejection mode. As discussed above, these elements of the system are modular, and mobile. Thus, they can be removed and employed at the next well site where the subterranean formation is or about to be stimulated.

Figure 4:
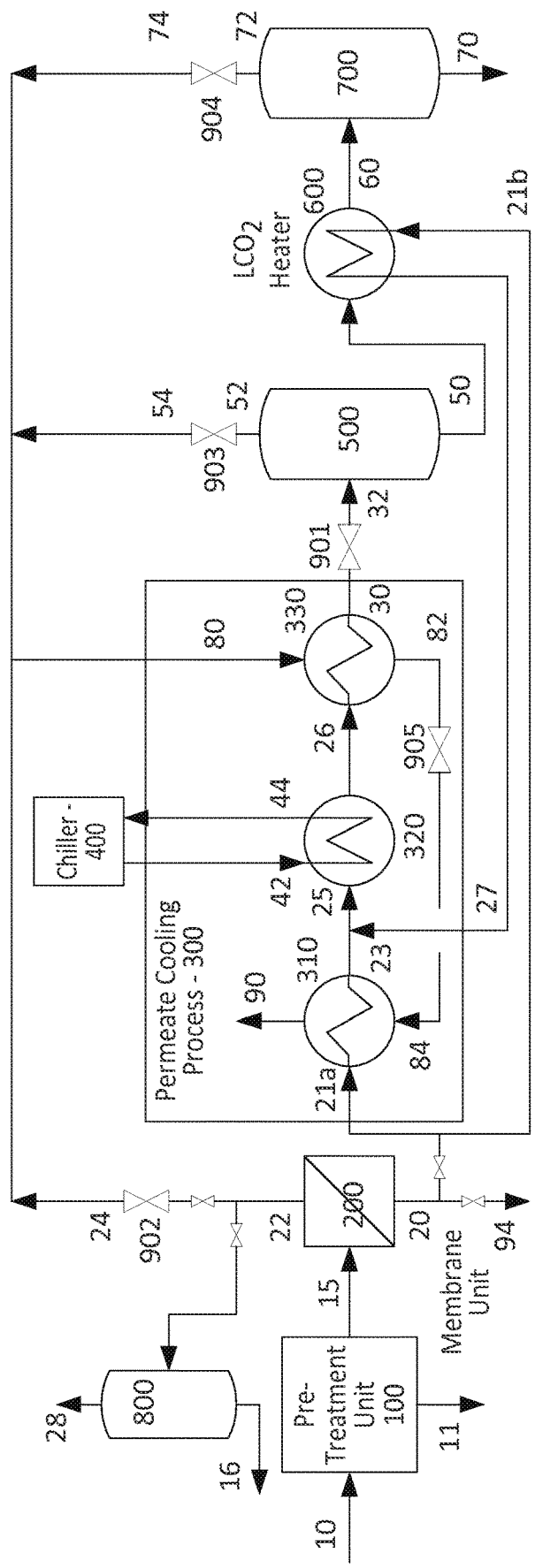
FIG. 4 is a detailed illustration of the system shown in FIG. 2.

FIG. 4, depicts a particular arrangement of the system embodied in FIG. 2. This arrangement, provides the system particulars within the permeate cooling process 300. This system, as discussed above, is capable of operating in either $CO_2$ recovery mode or $CO_2$ rejection mode.

Permeate 20 from the membrane is optionally split into a first permeate stream 21a which enters a first permeate cooler 310 and a second permeate stream 21b which enters the $LCO_2$ heater 600. Cooled permeate 23 from first permeate cooler 310 is blended with cooled permeate 27 from the $LCO_2$ heater 600 to form a blended stream of cooled permeate 25 which enters second permeate cooler 320 and is further cooled by heat exchange with refrigerant 42 from the chiller 400. Refrigerant 44 is returned to the chiller 400 from second permeate cooler 320. Further cooled permeate 26 is additionally cooled in a third permeate cooler 330 by the blend of process streams 54, 74, and 24 to form stream 80. Additionally cooled permeate 30 exits the permeate cooling process 300 and is sent to J-T valve 901. Stream 82 exits third permeate cooler 330, passes through J-T valve 905, which reduces the pressure and temperature of the blend of process gases 84. Low pressure process stream 84 provides cooling to first permeate cooler 310. The waste gas 90 from permeate cooler 310 is sent to a flare. Stream temperatures within the permeate cooling process 300 will vary as the composition and stream conditions of the flowback gas 10 changes over time. At permeate pressures of about 400 psig, the following temperature ranges will occur: Permeate streams 20, 21a and 21b will generally be in the range of 10 to 100° F. Cooled permeate 23 from the first permeate cooler 310 will generally be 0-25° F. The temperature of permeate 26 from the second permeate cooler will generally be −40 to +5° F. The temperature of permeate 30 from the third permeate cooler 330 will generally be 1-10° F. colder than the temperature of permeate 26 from the second permeate cooler.

Other equipment items, including the pretreatment unit 100, membrane unit 200, chiller 400, first phase separator 500, $LCO_2$ heater 600, second phase separator 700, and J-T valves 901, 902, 903 and 904 are similar to the ones discussed with respect to FIG. 2, above, and the retentate phase separator 800 is similar the one depicted in FIG. 3.

The arrangement of permeate cooling heat exchangers of FIG. 4 provides several additional benefits. Process streams 22, 52 and 72 are pressurized fluids normally containing a high concentration of $CO_2$. The ultimate destination for these streams is a flare with an outlet at atmospheric pressure. If these streams are depressurized and sent directly to flare, without being heated, several unfavorable conditions will occur. Temperature of the vent stream can become lower than minimum allowable working temperature of carbon steel and result in the need for more expensive materials of construction, such as 300 series stainless steel, to be used for the waste gas piping and flare stack. Solid $CO_2$ can form resulting in potential blockages. Condensation of hydrocarbon components can also occur, resulting in potential pooling of liquid hydrocarbons within the flare stack. To counter these unfavorable conditions, first permeate cooler 310 warms low pressure waste gas to temperatures greater than the minimum allowable working temperature of carbon steel. Permeate cooler 310 also causes any condensed hydrocarbons in stream 84 to vaporize. Formation of solid $CO_2$ may generally be prevented by operating all streams containing significant amounts of $CO_2$ at temperatures warmer than the triple point of pure $CO_2$ (−69.7° F.). This is accomplished in FIG. 4 by depressurizing and warming stream 80 in stages. Formation of solid $CO_2$ in low pressure waste streams 84 and 90 is prevented by careful selection of the pressure of stream 80. Stream 80 pressure is generally in the range of 15-165 psig and is set such that stream 80 is warmer than the $CO_2$ triple point temperature (−69.7° F.), yet cold enough that significant heat transfer occurs in third permeate cooler 330 and prevents solid $CO_2$ from forming in stream 84. In the exemplary systems shown in FIG. 2 and FIG. 4, receiver tanks or transport tanks may be utilized as phase separator 700. In such configurations, stream 60 would be sent from the process to a receiver tank or transport tank. Stream 72 would return vapor from the receiver tank or transport tank to the process. Stream 70 would accumulate in the receiver tank or transport tank. The advantage of such a configuration is the elimination of the need for a second phase separator and associated liquid level control valve in the $CO_2$ recovery process.

With reference to FIG. 4, the preferred heat source for the $LCO_2$ heater 600 is stream 21b, which is a portion of stream 20. Other sources of heat may be used, including ambient heat, refrigerant, engine coolant or oil, or compressor oil. Alternate process streams that can be used to heat stream 50 may include streams 10, 15, 20, 22, 23, 26 and 30. In the exemplary system of FIG. 4, stream 27 from the $LCO_2$ heater 600 returns to the process by mixing with stream 23, at the outlet of the first permeate cooler 310. Alternative return locations for stream 27 are stream 26 (outlet of second permeate cooler), stream 30 (outlet of third permeate cooler) or stream 32 (outlet of valve 901). The purpose of the $LCO_2$ heater and second phase separator is to provide a liquid $CO_2$ product that is not colder than the minimum allowable working temperature of the receiver. Normally, the receiver vessel will have a MAWT of −20° F., and so the temperature of liquid $CO_2$ product from the process needs to warmer than −20° F. at the receiver pressure. One alternate configuration is to not include the use of the $LCO_2$ heater and second phase separator. Instead the process may be stopped once the liquid product temperature becomes colder than −20° F. This configuration takes advantage of the fact that recovered $LCO_2$ from the first phase separator may be warmer than −20° F. at the start of the flowback and generally becomes colder as the flowback proceeds. However, the alternative configuration will usually result in less $CO_2$ recovery than the process which includes two phase separators and a liquid $CO_2$ heater.

Figure 5:
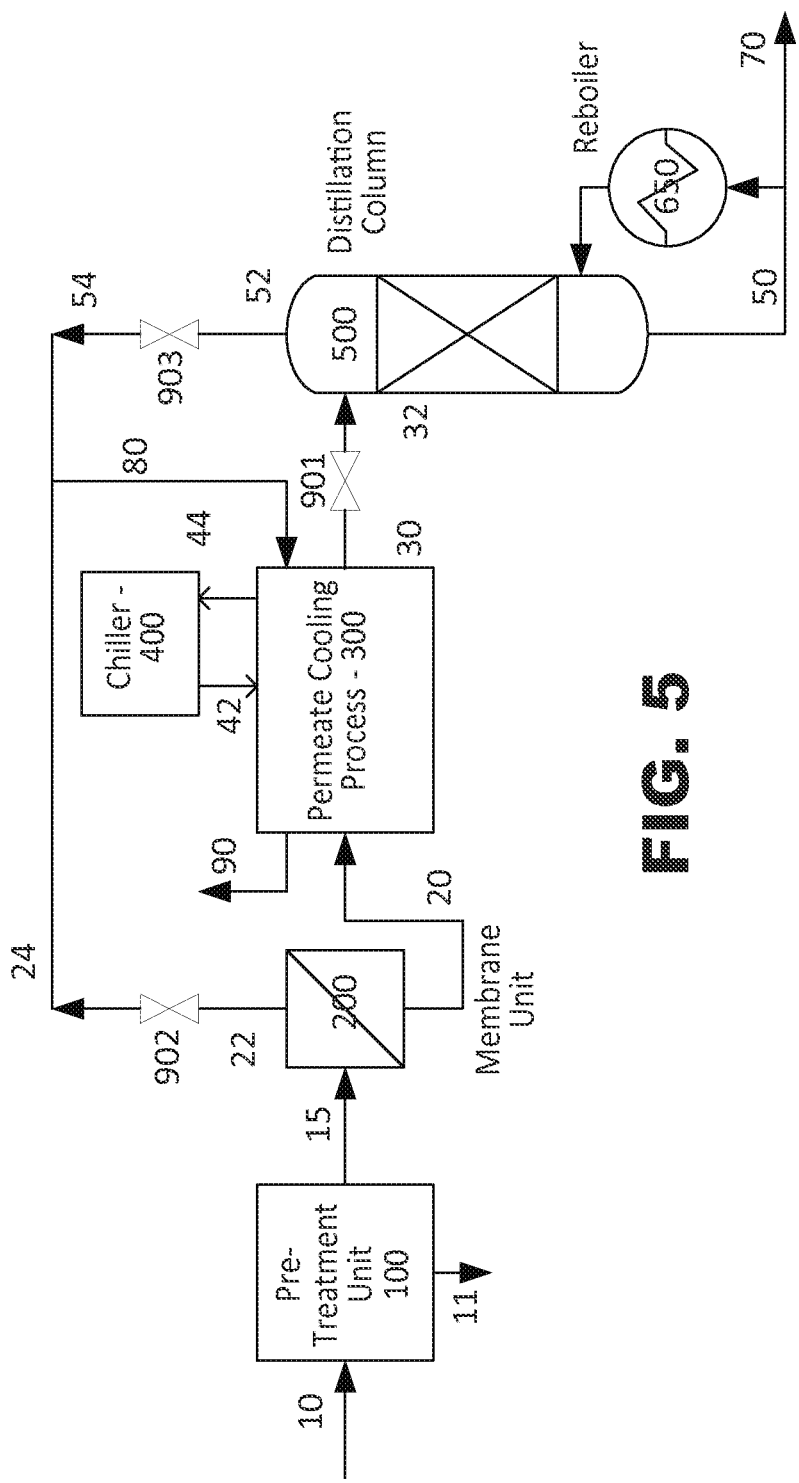
FIG. 5 illustrates another embodiment of FIG. 2 with an alternate separation system.
Figure 6:
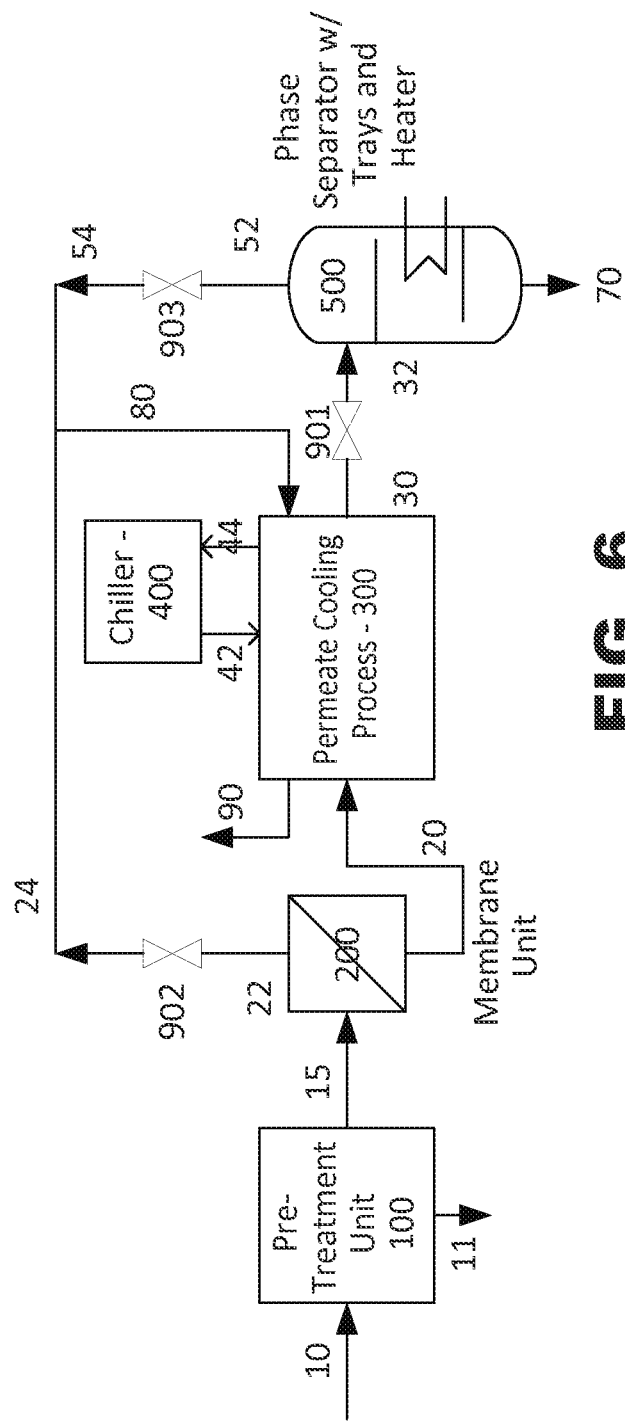
FIG. 6 illustrates a further system of FIG. 2 with yet another separation system.

In another alternative embodiment, and as illustrated in FIG. 5, a distillation column 500 in conjunction with a reboiler 650 is employed to adjust the temperature of the liquid $CO_2$ product. Such a distillation column may be configured a number of ways including the use of trays or packing, internal or external reboiler, and internal or external or no overhead condenser. The distillation column can be employed as a replacement for the two pressure vessels (phase separators), and the numerous distillation stages of separation yields a higher concentration $CO_2$ stream 50 (and 70). In a configuration of the present invention, and as shown in FIG. 6, the distillation column 500 is a phase separator with trays and an internal heater.

Figure 7:
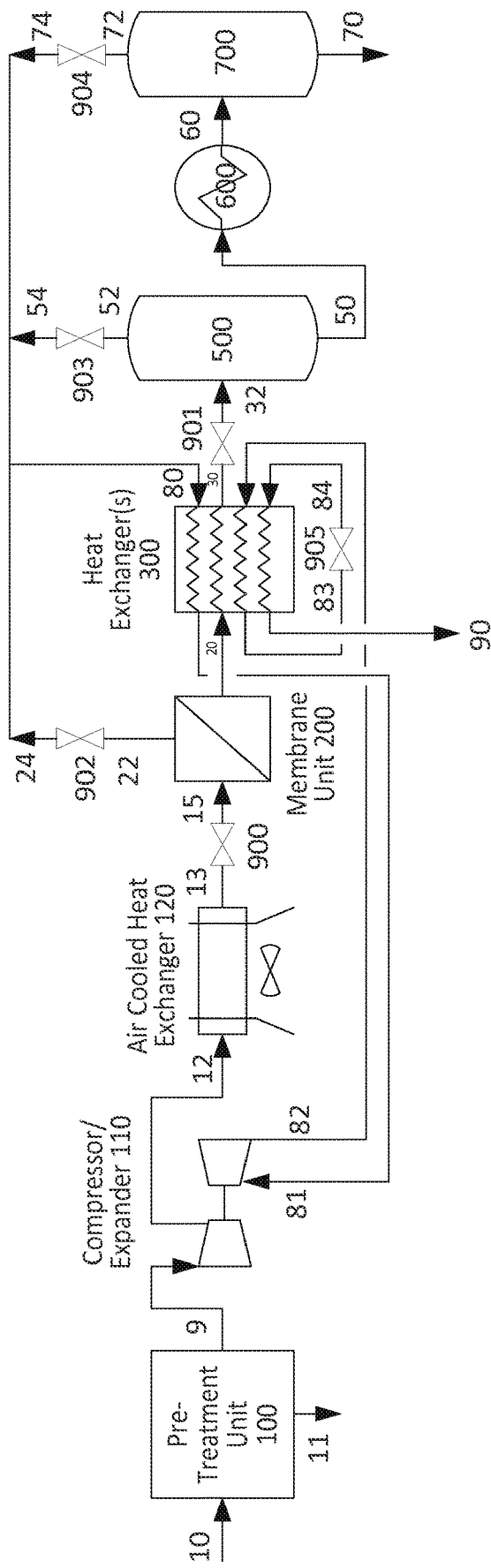
FIG. 7 depicts another exemplary system embodiment of the present invention.

In another exemplary embodiment of the invention, and with reference to FIG. 7, an expansion device, such as a gas turbine 110 can be disposed downstream of the pretreatment unit 100, but upstream of the membrane unit 200. Refrigeration produced when employing such an expansion device can be increased by integrating a compressor with the expander. This system has the benefits of not requiring a utility to drive a refrigerant compressor and requiring less space for process equipment. Pretreated flow back fluid 9 is routed to compressor/expander 110, where it is compressed to a pressure of 1300-2000 psia. The compressed flow back fluid 12 is cooled in heat exchanger 120, illustrated here as an air cooled heat exchanger. Flow back fluid 13, now cooled and elevated in pressure is sent to a pressure reducing valve 900. The resulting flowback fluid 15 is sent to the membrane unit 200, which produces permeate 20 and retentate 22. Permeate 20 is higher in $CO_2$ concentration than retentate 22. Permeate 20 is cooled in heat exchanger 300, illustrated here as a multi-stream heat exchanger. The function of heat exchanger 300 could also be performed by multiple dual stream heat exchangers as shown in previous embodiments. Cooled permeate 30 enters a pressure reducing valve 901. The reduced pressure permeate 32 comprises both liquid and vapor, and is sent to phase separator 500, where it is separated into a gaseous stream 52, enriched in methane and a liquid stream 50 which consists of predominantly liquid $CO_2$ and smaller amounts of methane, $C_{2+}$ hydrocarbon and nitrogen. Liquid stream 50 may be sent as product to storage or may be further processed by heating and additional phase separation as shown in previous embodiments.

Retentate 22 and phase separated gas streams 52 and 72 enter J-T valves 902, 903 and 904 respectively. The reduced pressure streams 24, 54 and 74 are blended into stream 80 and employed for cooling by indirect heat exchange in heat exchanger 300. The resulting blended gas stream 81 is sent to compressor/expander 110 where it is reduced in pressure and provides the driving energy for the compressor. Blended gas stream 82 from the expander provides cooling in heat exchanger 300, passes through pressure reducing valve 905 and is sent again to heat exchanger 300 to provide cooling. The resulting waste gas stream 90 is sent to flare or vented.

Figure 8:
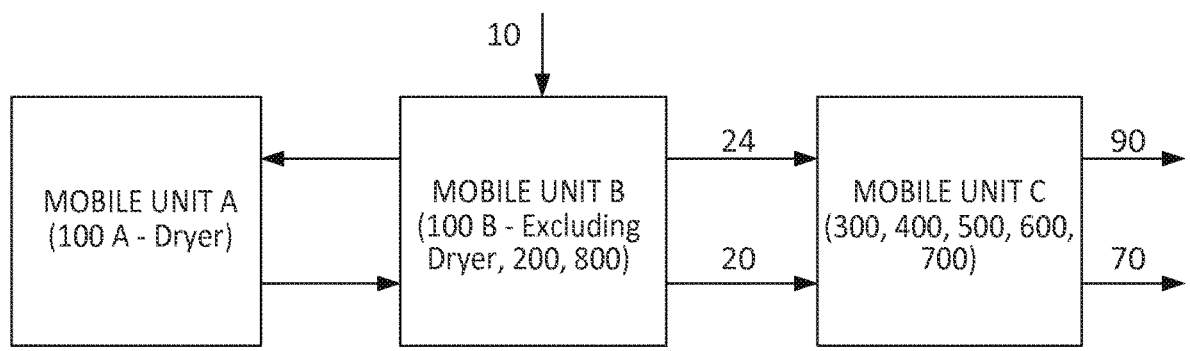
FIG. 8 depicts the equipment for the process of FIG. 4 distributed among several mobile units.

As illustrated in FIG. 8 an exemplary distribution system for the process equipment shown in the embodiment of FIG. 2 is shown among multiple mobile units. These multiple mobile units are useful when the footprint and/or weight of the process equipment is greater than may practically be carried on a single mobile unit. In this example, the dryer 100 A is mounted on one mobile unit. The remainder of the pretreatment equipment 100 B, the membrane unit 200, and the retentate phase separator 800 are mounted another mobile unit. The permeate cooling process equipment 300, chiller 400, first and second $CO_2$ phase separators 500 and 700, and liquid CO2 heater 600 are mounted on a third mobile unit.

Figure 9:
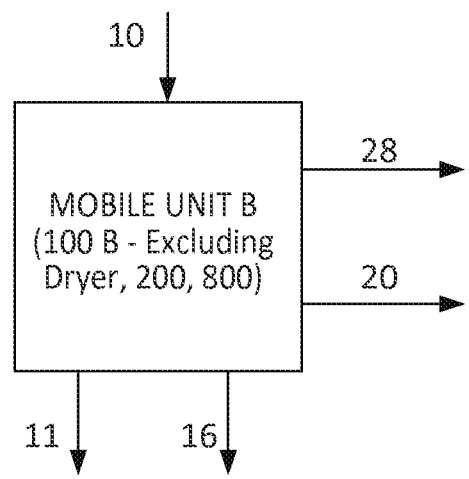
FIG. 9 illustrates the use of one of the mobile units of FIG. 8, when operating in a $CO_2$ rejection mode.

FIG. 9 depicts the equipment distribution of FIG. 8, but with the elimination of mobile units that are needed when operating in $CO_2$ recovery mode, but not needed when operating in $CO_2$ rejection mode. In this example, Mobile Units A and C are not shown, as all the equipment needed for operating in $CO_2$ rejection mode is mounted on Mobile Unit B. This distribution of process equipment enables Mobile Units A and C to be disconnected and used at a different location, with a different Mobile Unit B, once $CO_2$ recovery mode has ended.

The invention is further explained through the following Example, which is based on various embodiments of the system, but it is in no way to be construed as limiting the present invention.

EXAMPLE

Performance of the process was evaluated through simulation of the system shown in the embodiment of FIG. 4. Assumed process conditions of the flowback gas are shown in Table 1, and are assumed to be constant while the flowback process is operating.

TABLE 1

Flowback Gas Process Conditions

| | |
|---|---|
| Flow Rate, MMSCFD | 5 |
| Temperature, ° F. | 120 |
| Pressure, psia | 1215 |

Operating conditions for the $CO_2$ recovery process are shown in Table 2.

TABLE 2

$CO_2$ Recovery Operating Conditions

| | |
|---|---|
| Permeate Pressure, psia | 415 |
| Chiller Outlet Temperature, ° F. | 0 |
| LCO2 Product Pressure, psia | 265 |
| LCO2 Product Temperature, ° F. | −20 |

Performance of a $CO_2$ recovery process, is summarized in Table 3, below. The purpose of the process is to recover and liquefy $CO_2$ from the flowback gas. The first column with the heading "Elapsed Time", indicates the time from the start of the flowback gas flow, in approximately equal time periods. The $2^{nd}$-$8^{th}$ columns indicate the assumed dry basis composition of the flowback gas. Also shown in the table are the amount of $CO_2$ contained in the flowback gas, the amount of $CO_2$ recovered as liquid, and the purity of the recovered liquid $CO_2$. Over the periods shown in Table 3, in the aggregate, $CO_2$ concentration in the flowback decreases from 95.60% to 54.92%. The mass rate of $CO_2$ contained in the flowback gas is proportional to the $CO_2$ concentration and declines with time. Initially, the effectiveness of the $CO_2$ recovery process (i.e. the fraction of $CO_2$ in the flowback gas that is recovered as liquid) is about 93%. However, the recovery effectiveness declines with $CO_2$ concentration, so that by Period 10, when $CO_2$ concentration in the flow back gas is 54.9%, only about 23% of the contained $CO_2$ is recovered.

increasing concentration of $C_{2+}$ in the permeate. The exception to the trend of decreasing $CO_2$ purity is when feed is over 95% $CO_2$. When this occurs, the $CO_2$ concentration is high enough that the membrane unit is not needed. Therefore, it is bypassed. The $CO_2$ purity for Period 1 is lower than for Period 2 because on Period 1, hydrocarbons are not removed by the membrane.

Although Table 3 indicates the performance of the $CO_2$ recovery process for flow back $CO_2$ concentrations down to 54%, there is considerable flexibility of the process regarding when the $CO_2$ recovery process may be ended and when the $CO_2$ rejection process started. If it is desired to produce more liquid $CO_2$ at the expense of producing natural gas and natural gas liquids, the $CO_2$ recovery process may be extended. If it is desired to produce more natural gas and hydrocarbon condensates and less liquid $CO_2$ product, the $CO_2$ recovery process may be ended at an earlier point. Generally, the change in operating modes will take when the $CO_2$ concentration of the flowback is in the range of 50-80 mol %.

Operating parameters of the $CO_2$ rejection process, which produces natural gas and hydrocarbon condensates from flowback gas, is simulated based on the embodiment shown in FIG. 3, and are shown in Table 4, below. The pressure of flow back gas to the membrane is controlled at 915 psia and the permeate pressure is set at 30 psia. Natural gas liquids are produced both at the pressure reduction step in the pretreatment unit 100 and in the retentate stream 22. Phase separators are used at both of these locations to separate the hydrocarbon condensates.

TABLE 4

$CO_2$ Rejection Operating Conditions

| | |
|---|---|
| Membrane Feed Pressure, psia | 915 |
| Permeate Pressure, psia | 30 |
| Retentate $CO_2$ Concentration, mol % | 5% |

TABLE 3

$CO_2$ Recovery Process Performance

| Elapsed Time Period | AVERAGE FEED COMPOSITION (Dry Basis) | | | | | | | CO2 Contained in Flowback Gas tpd | CO2 Recovered as Liquid Product tpd | LCO2 Product Purity mol % |
|---|---|---|---|---|---|---|---|---|---|---|
| | CO2 mol % | N2 mol % | C1 mol % | C2 mol % | C3 mol % | nC4 mol % | nC5 mol % | | | |
| 1 | 95.6% | 0.1% | 2.9% | 0.4% | 0.5% | 0.3% | 0.3% | 277 | 258 | 96.9% |
| 2 | 91.1% | 0.1% | 5.8% | 0.7% | 1.0% | 0.7% | 0.6% | 264 | 228 | 97.8% |
| 3 | 86.6% | 0.2% | 8.7% | 1.1% | 1.5% | 1.0% | 0.9% | 251 | 200 | 97.6% |
| 4 | 82.0% | 0.3% | 11.7% | 1.4% | 2.0% | 1.3% | 1.3% | 238 | 173 | 97.5% |
| 5 | 77.5% | 0.3% | 14.6% | 1.8% | 2.5% | 1.7% | 1.6% | 225 | 147 | 97.2% |
| 6 | 73.0% | 0.4% | 17.6% | 2.2% | 3.0% | 2.0% | 1.9% | 212 | 122 | 97.0% |
| 7 | 68.5% | 0.5% | 20.5% | 2.5% | 3.5% | 2.4% | 2.2% | 199 | 99 | 96.7% |
| 8 | 64.0% | 0.5% | 23.4% | 2.9% | 4.0% | 2.7% | 2.5% | 185 | 77 | 96.3% |
| 9 | 59.4% | 0.6% | 26.4% | 3.2% | 4.5% | 3.0% | 2.8% | 172 | 56 | 95.9% |
| 10 | 54.9% | 0.7% | 29.3% | 3.6% | 5.0% | 3.4% | 3.2% | 159 | 37 | 95.5% |

Table 3 also indicates the changes in liquid $CO_2$ product purity that occur as the composition of the flow back gas changes. $CO_2$ is separated and purified in several steps. The pretreatment unit 100, removes contaminants such as water, solid particulates, liquid hydrocarbons, or hydrogen sulfide. The membrane unit 200 removes some of the methane, as well as most of the $N_2$ and heavier hydrocarbons. The flash tanks 500 and 700 remove additional methane. Most of the $C_{2+}$ hydrocarbons contained in the permeate will accumulate in the liquid $CO_2$ product. Thus, as $C_{2+}$ hydrocarbon concentration in the flowback gas increases over time, the purity of liquid $CO_2$ product decreases due to the corresponding Performance of a $CO_2$ rejection process, is shown in Table 5, below. This $CO_2$ rejection process uses the same pretreatment unit and membrane unit as the $CO_2$ recapture unit. The permeate cooling process 300, chiller 400, phase separators 500 and 700, and LCO$_2$ heater 600 are not used by the $CO_2$ rejection process, and may be removed and used at another location once the $CO_2$ recapture process has ended and the $CO_2$ rejection process has started.

The first columns of Table 5 are similar to Table 3, indicating the same elapsed time from the start of flowback and the same composition of the flowback gas. The time period in Table 5 is from Period 5 to Period 28, while the time period in Table 3 is from Period 1 to Period 10. The overlap in time periods is shown to illustrate that the process can be used to reject $CO_2$ for producing a product natural gas stream when $CO_2$ recovery is still an option. At 77.5% $CO_2$ in the feed, the product rates from the $CO_2$ rejection process are 0.23 MMSCFD of natural gas and 8200 gpd of hydrocarbon condensate. At 8.2% $CO_2$ in the feed, the product rates have increased to 3.52 MMSCFD of natural gas and 13400 gpd of hydrocarbon condensate.

TABLE 5

$CO_2$ Rejection Process Performance

| Elapsed Time Period | AVERAGE FEED COMPOSITION (Dry Basis) | | | | | | | Recovered Natural Gas MMSCFD | Recovered HC Condensates gpd |
|---|---|---|---|---|---|---|---|---|---|
| | CO2 mol % | N2 mol % | C1 mol % | C2 mol % | C3 mol % | nC4 mol % | nC5 mol % | | |
| 5 | 77.5% | 0.3% | 14.6% | 1.8% | 2.5% | 1.7% | 1.6% | 0.23 | 8200 |
| 6 | 73.0% | 0.4% | 17.6% | 2.2% | 3.0% | 2.0% | 1.9% | 0.34 | 9200 |
| 7 | 68.5% | 0.5% | 20.5% | 2.5% | 3.5% | 2.4% | 2.2% | 0.47 | 10100 |
| 8 | 64.0% | 0.5% | 23.4% | 2.9% | 4.0% | 2.7% | 2.5% | 0.62 | 10900 |
| 9 | 59.4% | 0.6% | 26.4% | 3.2% | 4.5% | 3.0% | 2.8% | 0.77 | 11500 |
| 10 | 54.9% | 0.7% | 29.3% | 3.6% | 5.0% | 3.4% | 3.2% | 0.94 | 12100 |
| 11 | 50.4% | 0.7% | 32.2% | 4.0% | 5.5% | 3.7% | 3.5% | 1.13 | 12500 |
| 12 | 45.9% | 0.8% | 35.2% | 4.3% | 6.0% | 4.1% | 3.8% | 1.33 | 12800 |
| 13 | 41.4% | 0.9% | 38.1% | 4.7% | 6.5% | 4.4% | 4.1% | 1.54 | 13100 |
| 14 | 37.0% | 0.9% | 40.9% | 5.0% | 6.9% | 4.7% | 4.4% | 1.76 | 13300 |
| 15 | 32.8% | 1.0% | 43.7% | 5.4% | 7.4% | 5.0% | 4.7% | 1.98 | 13400 |
| 16 | 28.8% | 1.1% | 46.3% | 5.7% | 7.8% | 5.3% | 5.0% | 2.20 | 13500 |
| 17 | 25.4% | 1.1% | 48.5% | 6.0% | 8.2% | 5.6% | 5.2% | 2.40 | 13600 |
| 18 | 22.4% | 1.2% | 50.4% | 6.2% | 8.5% | 5.8% | 5.4% | 2.58 | 13700 |
| 19 | 19.9% | 1.2% | 52.1% | 6.4% | 8.8% | 6.0% | 5.6% | 2.74 | 13700 |
| 20 | 17.7% | 1.2% | 53.5% | 6.6% | 9.1% | 6.2% | 5.8% | 2.88 | 13800 |
| 21 | 15.8% | 1.3% | 54.7% | 6.7% | 9.3% | 6.3% | 5.9% | 3.00 | 13800 |
| 22 | 14.2% | 1.3% | 55.8% | 6.9% | 9.4% | 6.4% | 6.0% | 3.11 | 13800 |
| 23 | 12.8% | 1.3% | 56.7% | 7.0% | 9.6% | 6.5% | 6.1% | 3.20 | 13900 |
| 24 | 11.6% | 1.3% | 57.5% | 7.1% | 9.7% | 6.6% | 6.2% | 3.28 | 13900 |
| 25 | 10.6% | 1.3% | 58.1% | 7.2% | 9.8% | 6.7% | 6.3% | 3.35 | 13900 |
| 26 | 9.7% | 1.4% | 58.7% | 7.2% | 9.9% | 6.8% | 6.3% | 3.42 | 13900 |
| 27 | 8.9% | 1.4% | 59.2% | 7.3% | 10.0% | 6.8% | 6.4% | 3.47 | 13600 |
| 28 | 8.3% | 1.4% | 59.6% | 7.3% | 10.1% | 6.9% | 6.4% | 3.52 | 13400 |

While the invention has been described in detail with reference to specific embodiments thereof, it will become apparent to one skilled in the art that various changes and modifications can be made, and equivalents employed, without departing from the scope of the appended claims.

What is claimed is:

1. A method of treating a flow back fluid exiting a well site following stimulation of a subterranean formation, wherein the method comprises:
a first carbon dioxide recovery mode in which a flow back fluid exiting a well site to a first carbon dioxide recovery mode where the flow back fluid is separated into a carbon dioxide rich stream at or above 300 to 600 psig and a carbon dioxide depleted stream, wherein the carbon dioxide rich stream is further processed and recovered, wherein the carbon dioxide rich stream is cooled to form a liquid carbon dioxide product which is routed to storage, while the carbon dioxide depleted stream is utilized in downstream processing to aid the formation of said liquid carbon dioxide product and subsequently said carbon dioxide depleted stream is flared;
continuing to operate in said first carbon dioxide recovery mode until the carbon dioxide concentration in the flow back fluid diminishes to a point selected within a range of 50-80 mol % in carbon dioxide concentration, after which switching to a second carbon dioxide rejection mode, in which the lower concentration carbon dioxide flow back stream is separated into a carbon dioxide rich permeate stream at less than 5-50 psig which is routed to waste or flare, and a carbon dioxide depleted retentate stream, which is recovered as a hydrocarbon rich product stream.

2. The method of claim 1, further comprising pretreating the flow back fluid prior to being separated during both the first carbon dioxide recovery and the second carbon dioxide rejection modes.

3. The method of claim 2, wherein the pretreatment process removes any one of water, solid particulates, liquid hydrocarbons, hydrogen sulfides or a combination thereof.

4. The method of claim 1, the carbon dioxide rich stream is cooled to a temperature ranging from −70 to 20° F. to ultimately form the liquid carbon dioxide product during the first carbon dioxide recovery mode.

5. The method of claim 4, further comprising: reducing the pressure on of the carbon dioxide rich stream exiting a cooling unit to a pressure ranging from 60-500 psig and the temperature ranging from −70 to 20° F.

6. The method of claim 5, further comprising: separating the carbon dioxide rich stream at a pressure ranging from 60-500 psig into a first liquid stream of predominantly carbon dioxide and a gaseous stream enriched in methane during the first carbon dioxide recovery mode.

7. The method of claim 6, further comprising: warming the first liquid stream of predominantly carbon dioxide and performing a further separation into a second the liquid carbon dioxide product stream further depleted of methane and the second gaseous phase stream enriched in methane.

8. The method of claim 7, further comprising: utilizing either or both the first and second gaseous phase streams enriched in methane with the carbon dioxide depleted stream, in the cooling unit.

* * * * *